United States Patent  
Baughman et al.

(10) Patent No.: US 12,197,473 B1
(45) Date of Patent: Jan. 14, 2025

(54) SOCIAL MEDIA CLIENT FINGERPRINTING

(71) Applicant: The Government of the United States as represented by the Director, National Security Agency, Ft. George G. Meade, MD (US)

(72) Inventors: Brian M. Baughman, Silver Spring, MD (US); Rodrigo P. Gomez, Columbia, MD (US); Ryan L. Kaliszewski, Columbia, MD (US); Shawn L. Robertson, Wellington (NZ)

(73) Assignee: The Government of the United States as represented by the Director, National Security Agency

( * ) Notice: Subject to any disclaimer, the term of this patent is extended or adjusted under 35 U.S.C. 154(b) by 291 days.

(21) Appl. No.: 17/519,000

(22) Filed: Nov. 4, 2021

Related U.S. Application Data

(60) Provisional application No. 63/109,989, filed on Nov. 5, 2020.

(51) Int. Cl.
 *G06F 16/28* (2019.01)
 *G06F 16/9536* (2019.01)
 *G06N 20/00* (2019.01)

(52) U.S. Cl.
 CPC ........ *G06F 16/285* (2019.01); *G06F 16/9536* (2019.01); *G06N 20/00* (2019.01)

(58) Field of Classification Search
 None
 See application file for complete search history.

(56) References Cited

U.S. PATENT DOCUMENTS

| 2011/0035330 A1* | 2/2011 | Li | G06Q 40/06 705/36 R |
| 2016/0379132 A1* | 12/2016 | Jin | H04L 67/535 706/12 |
| 2017/0124303 A1* | 5/2017 | Baldwin | G06F 21/105 |
| 2020/0034853 A1* | 1/2020 | Lim | G06Q 20/4016 |

OTHER PUBLICATIONS

Angelov, D.; "Top2Vec: Distributed Representations of Topics," pdf obtained from Web Page <arvix.org/abs/2008.09470> 25 pages, Aug. 19, 2020, Retrieved from arXiv.org e-Print archive <https://arxiv.org> on Nov. 4, 2021.

* cited by examiner

*Primary Examiner* — Giuseppi Giuliani

(57) ABSTRACT

A method is disclosed for identifying related social media accounts of a social media platform, based on social media clients used to interact with the platform. The method includes obtaining a first dataset of information including, for each interaction between the accounts and the platform, the client used. The method also includes using the first dataset to generate a pruned dataset including accounts, clients, and numbers of interactions by using an unsupervised machine learning algorithm to identify and exclude outlier accounts and outlier clients. The method also includes normalizing the pruned dataset across accounts. The method also includes identifying a connected sub-component of the pruned dataset. The method also includes performing topic modeling of the sub-component to generate a matrix W associating the accounts of the sub-component with topics. The method also includes determining, using the matrix W, that a first account A is associated with a second account B.

12 Claims, 14 Drawing Sheets

SOCIAL MEDIA CLIENT FINGERPRINTING

CROSS REFERENCE TO RELATED APPLICATIONS

This application claims priority to U.S. provisional patent application Ser. No. 63/109,989, filed Nov. 5, 2020, titled "Social Media Client Fingerprinting," the contents of which are hereby incorporated by reference herein in their entirety.

FIELD OF THE INVENTION

The present invention relates generally to topic modeling, and in particular to methods of social media client fingerprinting using topic modeling.

SUMMARY

One embodiment of the present invention is a method of identifying related social media accounts in a plurality of social media accounts of a social media platform, based on social media clients used by the social media accounts to interact with the social media platform. The method includes obtaining a first dataset of information including, for each interaction between one of the plurality of social media accounts and the social media platform, information representing the social media client used by the account for the interaction. The method also includes using the first dataset of information to generate a pruned dataset of information including accounts, clients, and numbers of interactions between the accounts and clients by using an unsupervised machine learning algorithm to identify and exclude outlier accounts and outlier clients from the first dataset. The method also includes normalizing the pruned dataset across accounts. The method also includes identifying, in the pruned dataset, at least one connected sub-component of the pruned dataset. The method also includes performing topic modeling of the at least one connected sub-component to generate a matrix W associating the accounts of the connected sub-component with topics from the topic modeling. The method also includes determining, using the matrix W, that a first account A is associated with a second account B.

In a related embodiment, identifying outlier accounts includes identifying at least one account with interactions with a large number of different clients.

In another related embodiment, identifying outlier clients includes identifying at least one client with interactions with a large number of different accounts.

In another related embodiment, identifying outlier clients includes identifying at least one client with interactions with only one account.

In another related embodiment, identifying outlier clients and outlier accounts includes identifying at least one account-client pair with interactions with a small number of interactions.

In another related embodiment, the method also includes performing a dimensionality reduction on the matrix W to generate a reduced matrix. The method also includes performing a density-based unsupervised clustering algorithm on the reduced matrix to determine that a group of at least three accounts are all associated with each other.

Another embodiment of the present invention is a method of identifying related social media clients in a plurality of social media clients used to interact with a social media platform, based on the social media accounts that use the social media clients to interact with the social media platform. The method includes obtaining a first dataset of information including, for each interaction between one of the plurality of social media accounts and the social media platform, information representing the social media client used by the account for the interaction. The method also includes using the first dataset of information to generate a pruned dataset of information including accounts, clients, and numbers of interactions between the accounts and clients by using an unsupervised machine learning algorithm to identify and exclude outlier accounts and outlier clients from the first dataset. The method also includes normalizing the pruned dataset across accounts. The method also includes identifying, in the pruned dataset, at least one connected sub-component of the pruned dataset. The method also includes performing topic modeling of the at least one connected sub-component to generate a matrix H associating topics from the topic modeling with the clients of the connected sub-component. The method also includes determining, using the matrix H, that a first client X is associated with a second client Y.

Another embodiment is a method of identifying related social media accounts and clients in a plurality of social media accounts of a social media platform and a plurality of social media clients used by the social media accounts to interact with the social media platform. The method includes obtaining a first dataset of information including, for each interaction between one of the plurality of social media accounts and the social media platform, information representing the social media client used by the account for the interaction. The method also includes using the first dataset of information to generate a second dataset of information including accounts, clients, and numbers of interactions between the accounts and clients by generating a corpus of documents representing client usage by account over time. The method also includes using an unsupervised machine learning algorithm to train an embedding function and apply the embedding function to translate accounts and clients to jointly embedded vectors in a high dimensional space. The method also includes performing dimensionality reduction to project the high dimensional space to a reduced matrix having lower dimension. The method also includes performing a density-based unsupervised clustering algorithm on the reduced matrix to generate clusters. The method also includes using the clusters to determine that each member of a group of accounts is associated with each other member of the group of accounts. The method also includes using a distance from the embedded vector for a client X to a centroid of each cluster to determine that client X is associated with each member of a group G of accounts.

DETAILED DESCRIPTION

Social media companies face a difficult issue of moderating their platforms and detecting coordinated inauthentic activity in a language-independent manner. The sheer volume of user accounts also presents difficulty to researchers and election integrity watchdogs. Performing an unsupervised machine learning process to associate accounts allows for more efficient triage of social media data. This process will also reveal groups of social media clients which have been used together and can thus be associated with one another. Successful detection of the presence of suspicious infrastructure spread across accounts will allow social media moderators to take actions to mitigate influence operations early on in the process and before damage has been done.

Figure 1A:
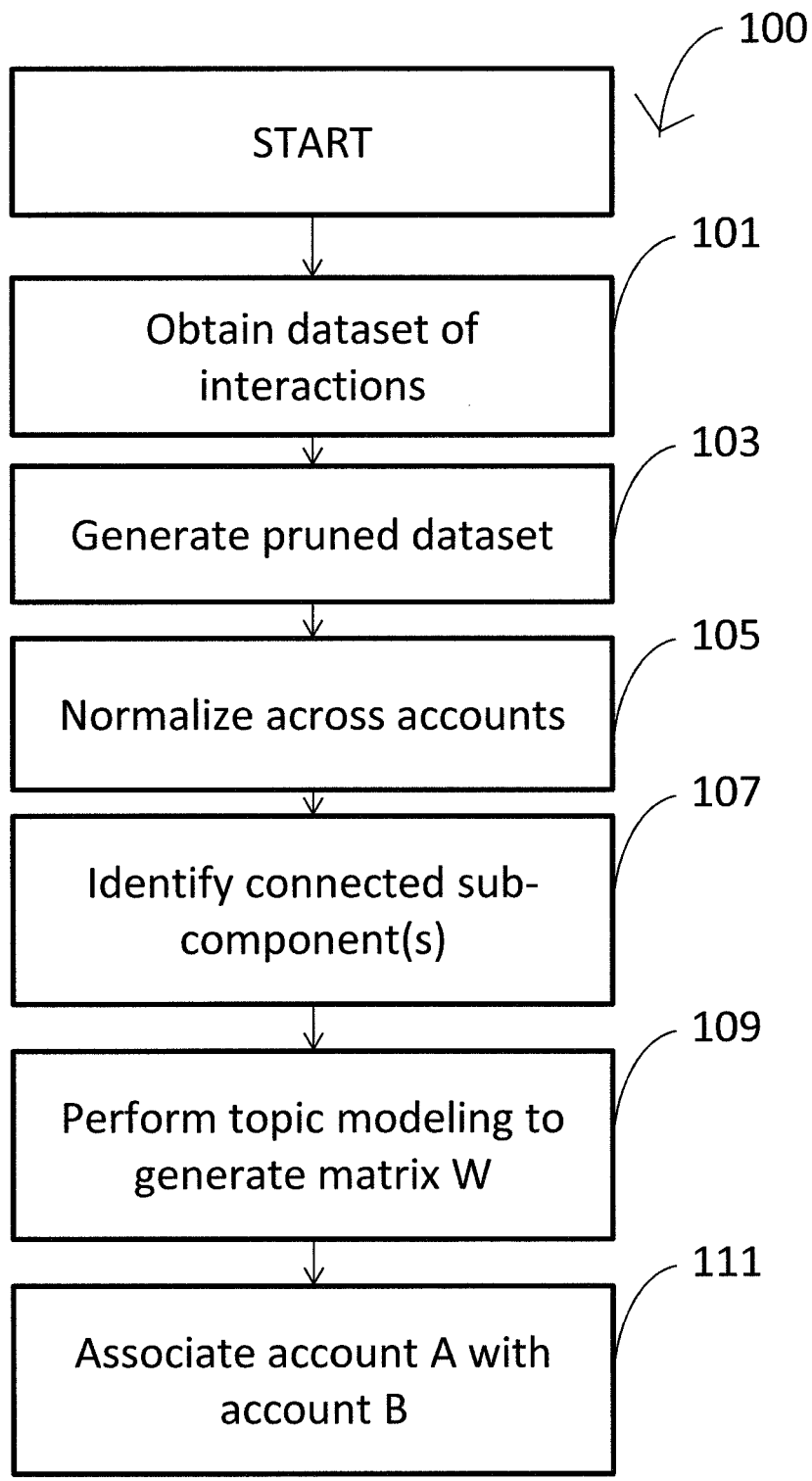
FIG. 1A is a flow chart illustrating a method in accordance with an embodiment of the present invention.

A process 100 in accordance with an embodiment is now described with reference to FIG. 1. The process 100 includes a series of actions described in a particular order, however, these actions may be performed in any order that would be understood as appropriate by those of skill in the art. The process 100 begins at block 101 where a dataset of interactions is obtained. Data can be ingested in the form of, e.g., (user, client) tuples for each interaction with the desired social media platform. This data can then be used, e.g., to form an undirected bipartite graph where one set of nodes are accounts (or users), the other set is clients, and edge weights are the number of times a user uses that particular client to interact with the social media platform. The data can also be used, alternatively, to generate a document representing social media client usage by account over time that can be processed subsequently by a document search/processing algorithm.

The process 100 continues at block 103 where a pruned dataset is generated. The process 100 can prune data points, such as in the case of the bipartite graph described above, by pruning edges of the graph starting from edges having less than a minimum edge weight in order to avoid drawing false correlations between clients. For example, users may experiment with new social media clients, briefly trying them out, but then choose not to continue to use one or more of those clients. By removing data showing only a very small number of interactions, this sort of weak association can be removed from the data before further processing. Outliers also may be pruned based on various further factors as may be appreciated by those skilled in the art. Outlier clients, whether used by too few accounts or those used by too many accounts, may be identified and pruned. Similarly outlier accounts may be identified and pruned based on their interacting with an unusually large number of clients. Outliers can thus be removed from the underlying graph and the resulting subcomponents may in some embodiments be further ordered by number of nodes. According to certain embodiments it may be beneficial, however, to keep nodes which are accounts that use a single client. If enough of them are present to generate a topic of size 1, they can still contribute to understanding of what technology is shared by users.

In identifying outlier clients and accounts, the distribution of unique user accounts per client may not approximate a normal distribution. Standard (outlier) clients will often be used by substantially more users than non-standard clients. Detecting and removing standard clients as in FIG. 9 will prevent drawing potentially false associations between a large number of accounts. In one embodiment, the distribution may be modeled as a mixture of two normal distributions. In another embodiment, the distribution may be modeled as a mixture of an exponential distribution and a wide normal distribution.

Figure 3:
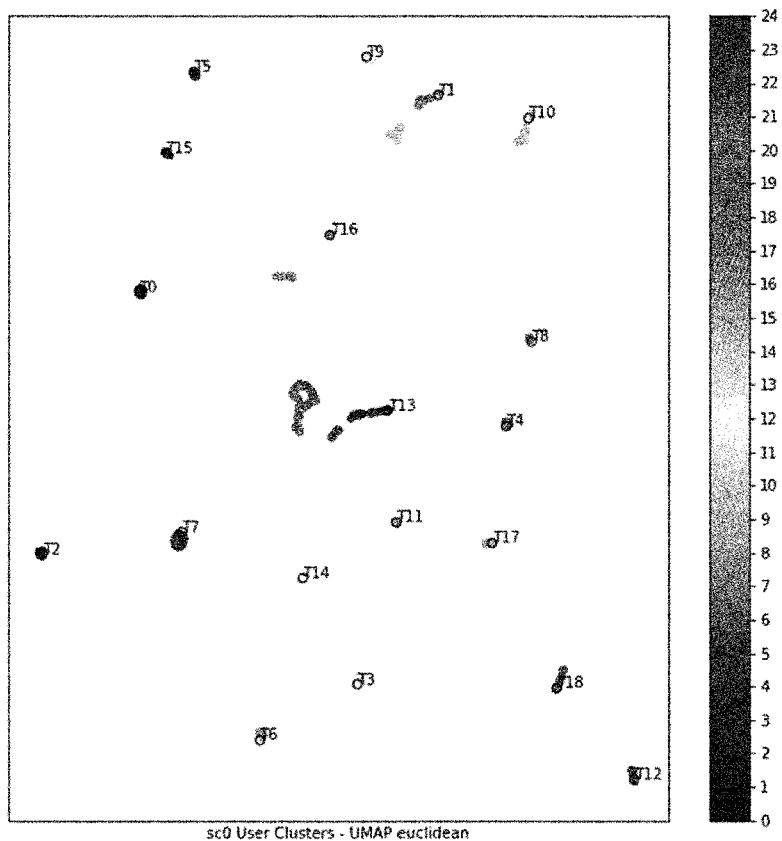
FIG. 3 is a graph illustrating information relating to a connected sub-component in accordance with an embodiment of the present invention.
Figure 4:
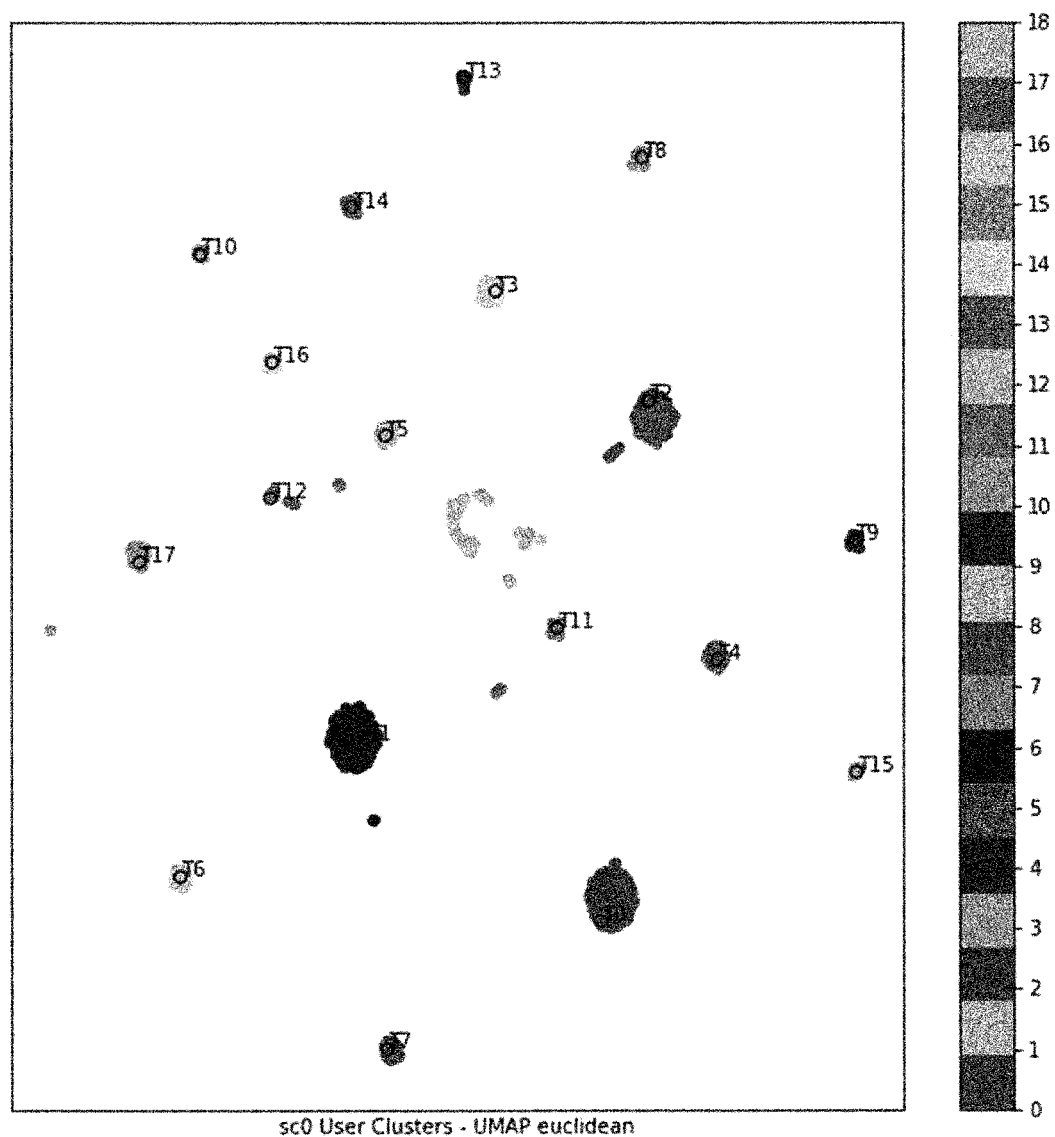
FIG. 4 is a graph illustrating information relating to a connected sub-component in accordance with an embodiment of the present invention.

In one embodiment, outliers may also be detected by performing agglomerative clustering to maximize a cost function. A cost function can be used to determine the "best" number of clusters as described below.

$$\sum_{i=0}^{n} \text{outer}(i) - \beta * \text{inner}(i) - \gamma$$

where outer(i) is the minimal distance between cluster i and any other cluster, inner(i) is the distance between the maximum and minimum values of cluster i, beta is a multiplier to the inner cluster distance to penalize having a single large cluster, and gamma is a constant for each cluster to penalize having many small clusters. A beta value of 1 and a gamma value of 2 obtains good results for both datasets as shown in FIG. 3 and FIG. 4.

Figure 5:
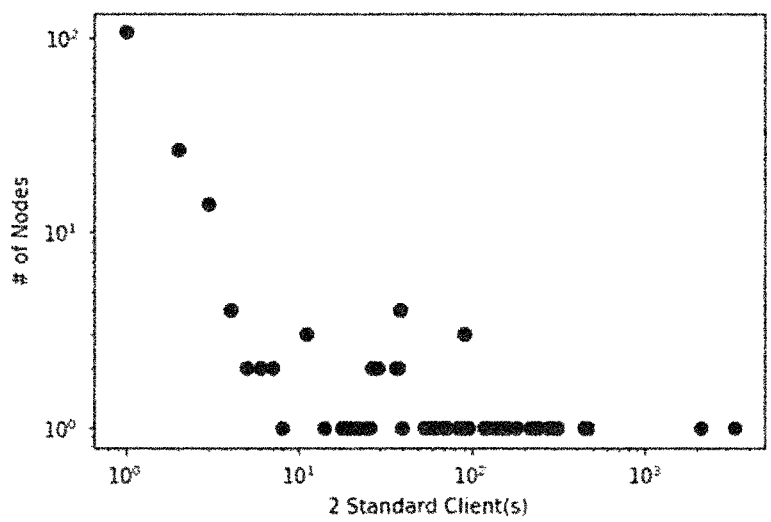
FIG. 5 is a graph illustrating a dataset of information relating to interactions with a social media platform for outlier detection in accordance with an embodiment of the present invention.
Figure 6:
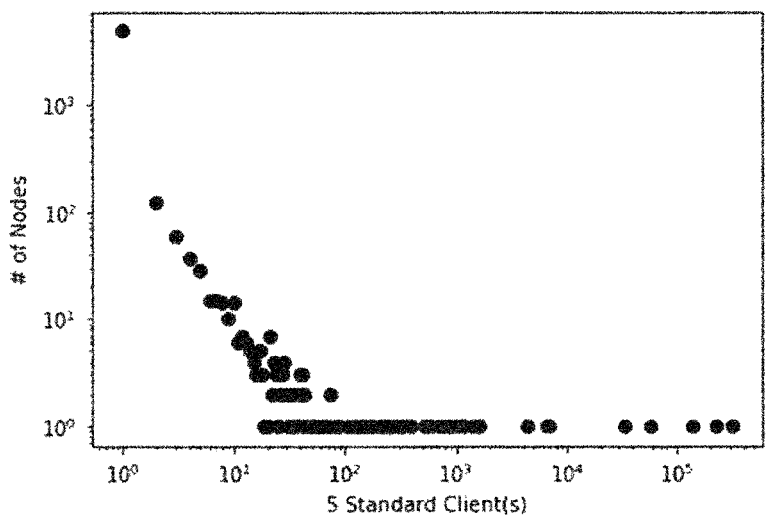
FIG. 6 is a graph illustrating a dataset of information relating to interactions with a social media platform for outlier detection in accordance with an embodiment of the present invention.
Figure 10:
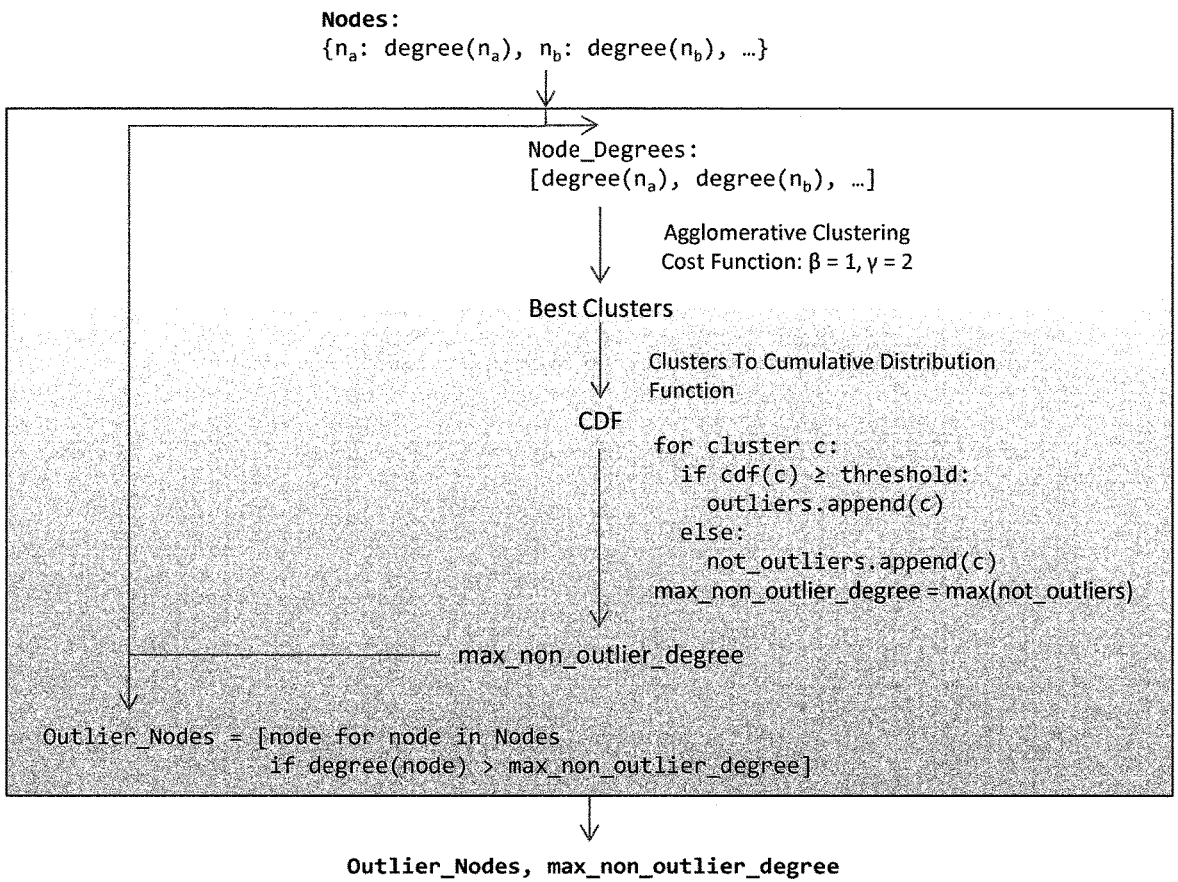
FIG. 10 is a diagram including pseudocode illustrating a method in accordance with an embodiment of the present invention.

In accordance with one embodiment, a custom one-dimensional implementation was used in order to obtain substantial performance improvements compared to N-dimensional agglomerative clustering. Simplifying assumptions can be made when operating across the number line. Once the optimal clusters are detected they are sorted by magnitude (number of clients). The percent of total clients contained within each cluster is calculated. Clusters are considered outliers (standard) if the cumulative percentage of all lower magnitude clusters is greater than a threshold value as demonstrated in FIG. 10. In the examples given below, 95% is used as a threshold percentage. Results for the datasets of FIGS. 3 and 4 are shown in FIGS. 5 and 6, respectively.

Figure 9:
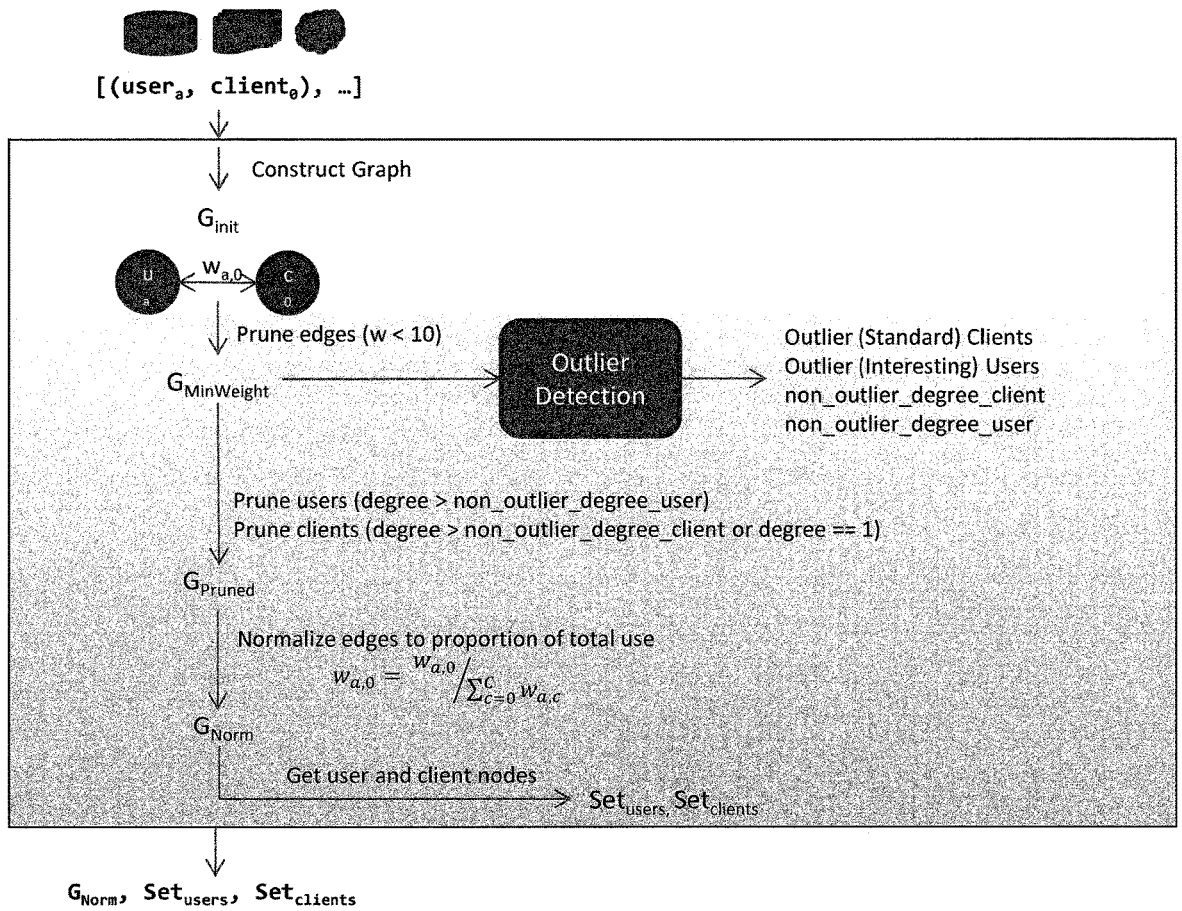
FIG. 9 is a flow chart illustrating a method in accordance with an embodiment of the present invention.

Some small number of users per dataset are often particularly atypical based on client usage alone, such as when they utilize a very high number of different clients. Removing these users from the graph, as shown in FIG. 9, prior to running topic modeling and dimensionality reduction prevents drawing potentially false associations between clients.

Figure 7:
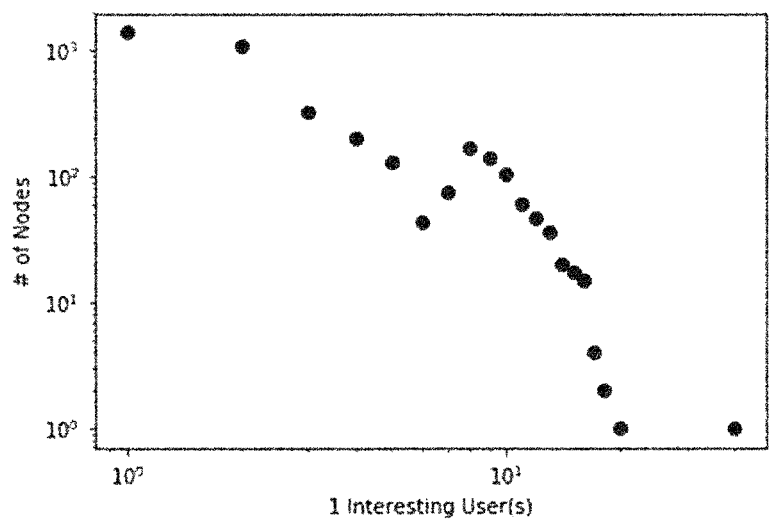
FIG. 7 is a graph illustrating a dataset of information relating to interactions with a social media platform for outlier detection in accordance with an embodiment of the present invention.

A similar agglomerative clustering model can be used to determine account outliers as was discussed above for clients. In FIG. 7 we have an example using the dataset of FIG. 3, all users with more than 20 clients are maintained (after dropping any edges less than 10). Here we are left with a single user that has 97 unique clients. It uses 40 of them at least 10 times.

In some applications, users having fewer than, e.g., 10 interactions with the social media platform using a specific client may be deemed to be low magnitude. This was determined during analysis of one specific dataset. Users may experiment with different clients for a while, but may eventually decide that certain clients are not something they want to keep using. A substantial amount of the clients in the exemplary datasets illustrated here are never used greater than 10 times by any user. Other datasets may contain clients which are used only once by a variety of potentially linked accounts.

The process 100 continues at block 105 where the pruned dataset is normalized across accounts. Normalizing the data remaining after pruning can be performed to ensure that each user account's collection of entries sum to 1 and the (user, client) pair is the percentage of the user's total pruned interactions with the social media platform using that specific client. At this point it the process 100 also may prune all edges within this normalized graph which are less than a certain minimum percentage, such as 1%.

Figure 11:
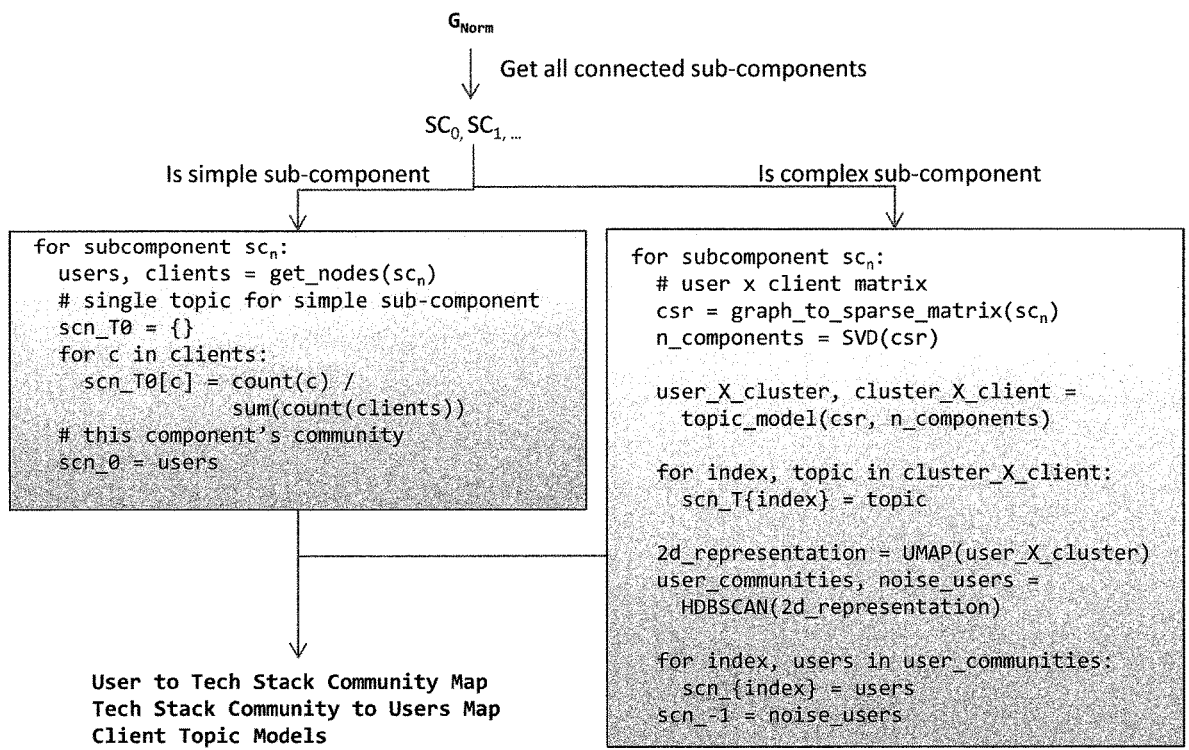
FIG. 11 is a diagram including pseudocode illustrating a method in accordance with an embodiment of the present invention.

The process 100 continues at block 107 where one or more connected sub-components are identified in the pruned dataset. If a pair of (user, client) data points share either the same user or the same client, then those data points belong to the same connected sub-component. The process 100 may determine which sub-components are considered complex enough to require running topic modeling on. Some sub-components may instead be classified as "simple," in which case topic modeling is not necessary. For example, an embodiment is shown in FIG. 11, in which clients in a simple sub-component are instead defined as a single technology stack, and all users of such clients are associated with a single community. In one embodiment, an elbow finding method may be used based on the percentage of total nodes of the dataset that are contained within the sub-component.

The process 100 continues at block 109 where topic modeling is performed to generate a matrix W. Complex sub-components can be processed as follows. First, the sub-component is translated into a matrix that maps users to clients, where users are rows and clients are columns. Entry i,j of the matrix represents the percent of pruned interactions where user i uses client j. Then the number of topics is determined for this user, client matrix. This may be done in an automated fashion by, for example, singular value decomposition (SVD) and elbow finding. At this point topic modeling can be used as a form of dimensionality reduction on the user, client matrix. In one embodiment, Non-negative Matrix Factorization (NMF) may be used as the topic modeling algorithm.

Figure 8:
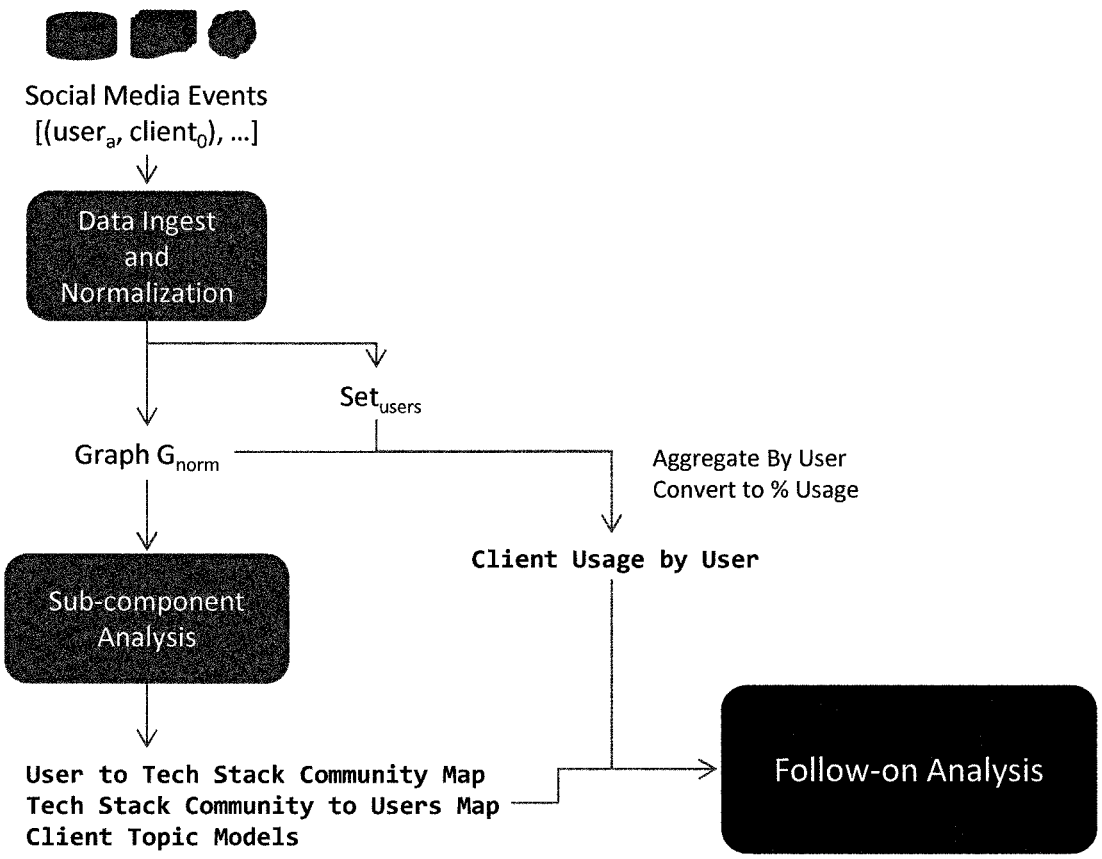
FIG. 8 is a flow chart illustrating a method in accordance with an embodiment of the present invention.

The process 100 continues at block 111 where a first account A is associated with a second account B by similarity metrics applied to the W matrix. Applying a similarity metric to the W matrix allows determining user accounts which use similar clients in similar proportions to interact with the social media platform. In one embodiment, cosine similarity may be used as the similarity metric By identifying sets of clients that individual users commonly use together, it is possible to identify communities of users who employ similar clients in similar proportions, which we refer to as technology stacks as shown in FIG. 8. Identifying such communities may be useful for many reasons. Users with similar technology stacks may behave in similar fashion to one another and may in some cases be indicative of persons who are affiliated with one another in some way. In some cases such user accounts may even belong to the same individual person. Individual people will prefer to use specific clients in order to interact with a social media platform. This makes it possible to identify multiple accounts owned by the same user. Looking at a user's clients can shed light on which technology platform they prefer (e.g., Android, iOS, desktop), as well as serve as a first filter for potential maliciousness. This allows for determining user technology stack communities. Many social media platforms make it difficult if not impossible to view a user's client history at a glance. Publicly available datasets contain clients used which should be considered suspicious at best. Methods in accordance with embodiments of the present invention can efficiently derive such information and associations. Examining a user's client usage over time may also indicate which clients are used for different online activities. Research has shown that influence operations such as advertising campaigns have distinct phases which may be associated with specific clients.

A specific user of a social media platform will have technology preferences in order to accomplish specific tasks. This preference may persist across multiple accounts if they are not making a conscious effort to diversify client usage in order to avoid scrutiny from social media platform owners. Organizations which have sponsored the creation of a specific client will want to obtain a return on investment and will have their employees use this technology. Embodiments of the present invention have been used in connection with data sets of interest to successfully define technology stack communities and associate them with groups of users.

Figure 1B:
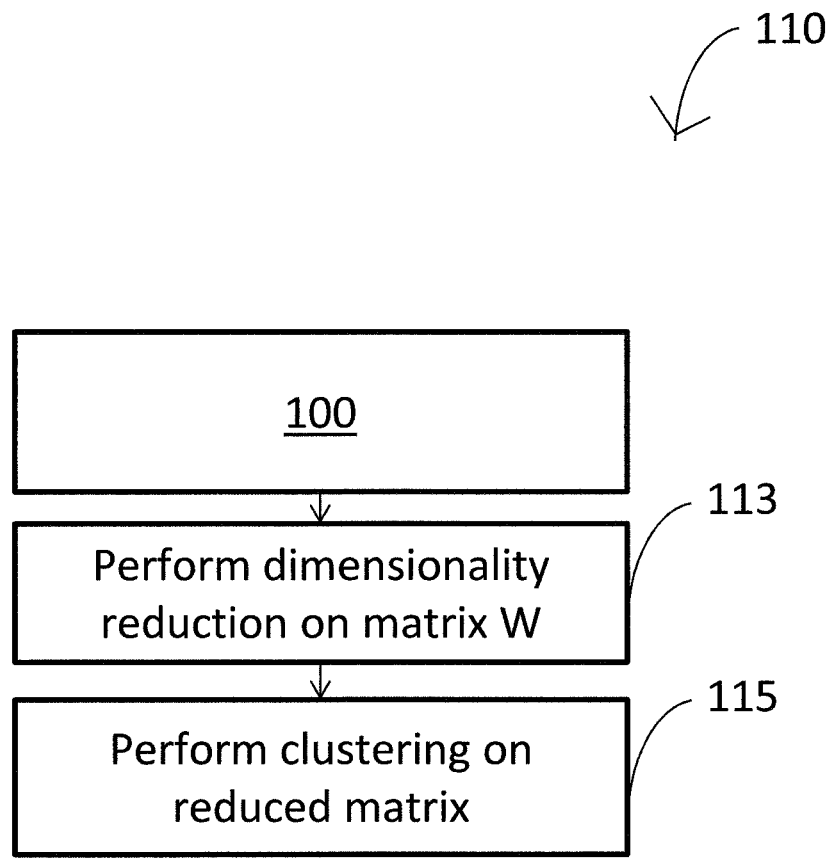
FIG. 1B is a flow chart illustrating a method in accordance with an embodiment of the present invention.

A process 110 may continue the actions of process 100 in accordance with an embodiment of the invention, as is now discussed with reference to FIG. 1B. This process will determine groups of at least three accounts that are defined as similar. The process 110 continues at block 113, where dimensionality reduction is performed on the matrix W to improve clustering performance. According to one embodiment, this may involve using UMAP to reduce the user, topic matrix to two dimensions. In other embodiments, dimensionality reduction can instead reduce to a different number of dimensions as may be appreciated by those of skill in the art, such as three, four, or five dimensions. The process 110 continues at block 115, where clustering is performed on the reduced matrix. This may include running HDBSCAN on the two-dimensional representation of the reduced matrix in order to generate multiple communities of users with similar client usage. These are technology stack communities as discussed above and shown in FIG. 8. Technology stack communities with very little variation on the UMAP projection indicate users with very similar proportional posting across different clients. These are potentially related accounts.

An example of such an application can be seen in FIG. 3, which is a graph showing example user tech stack communities which are part of the largest connected sub-component of the graph after removing standard clients. The identity matrix of topics has also been graphed, which shows that many users are almost entirely represented by a single topic (blobs around a T{X} point). Some use a mixture of topics and have been grouped together away from any of the T{X} points.

Another example can be seen in FIG. 4, which shows example user tech stack communities which are part of a complex sub-component after removing standard clients. The identity matrix of topics has also been graphed, which shows that many users are almost entirely contained within a single topic (blobs around T{X} point). In this example, user tech stack community 15 appears to almost exclusively use Topic 10, whereas user tech stack community 12 is a good example of a community which uses a variety of topics.

The dataset shown in FIG. 3 has about 100 times fewer user tech stack communities than raw users. This includes the 'basic' users who exclusively use standard clients. The 'basic' user community allows for quickly filtering out individuals as most likely not to lead to important information.

Figure 2A:
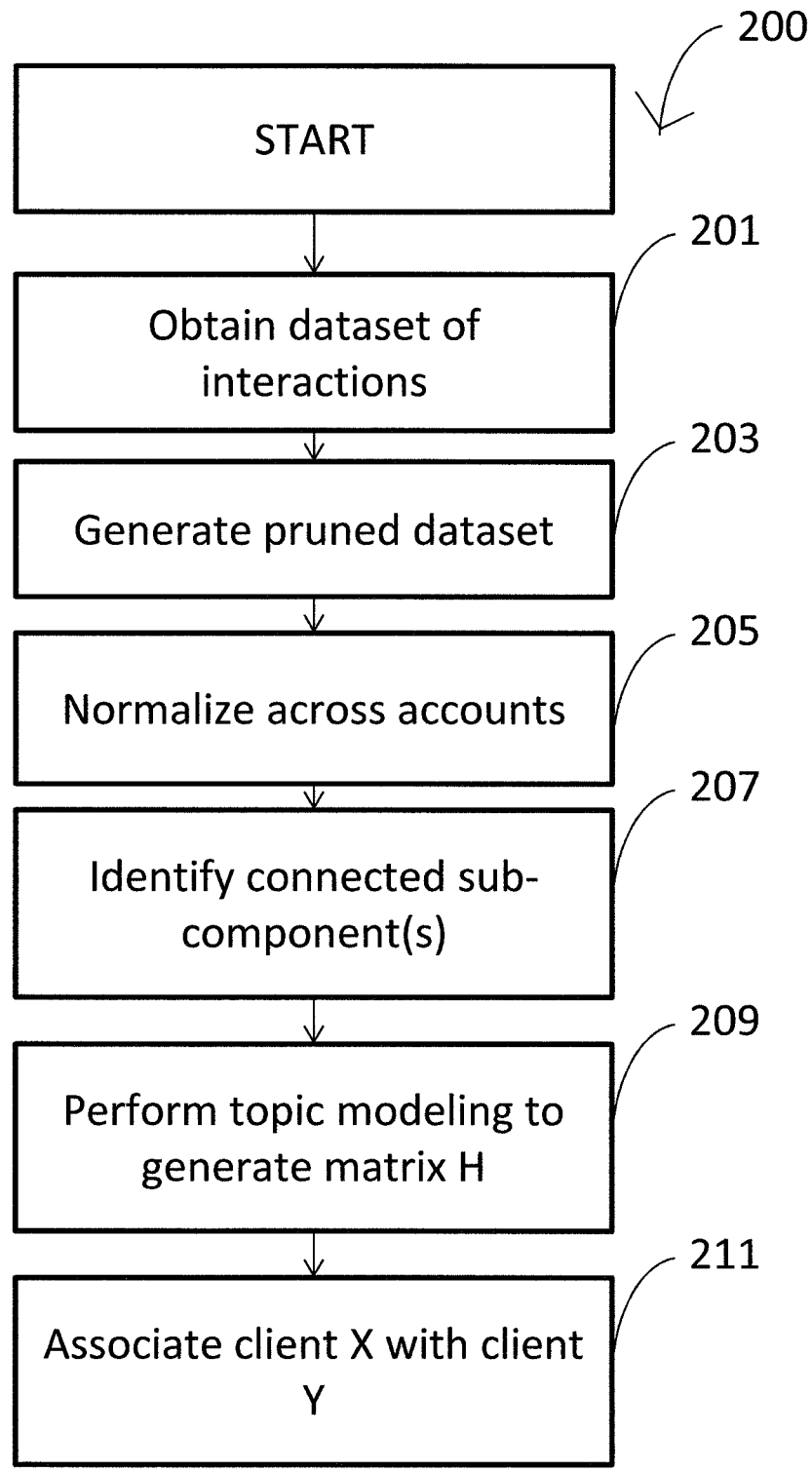
FIG. 2A is a flow chart illustrating a method in accordance with an embodiment of the present invention.
Figure 2B:
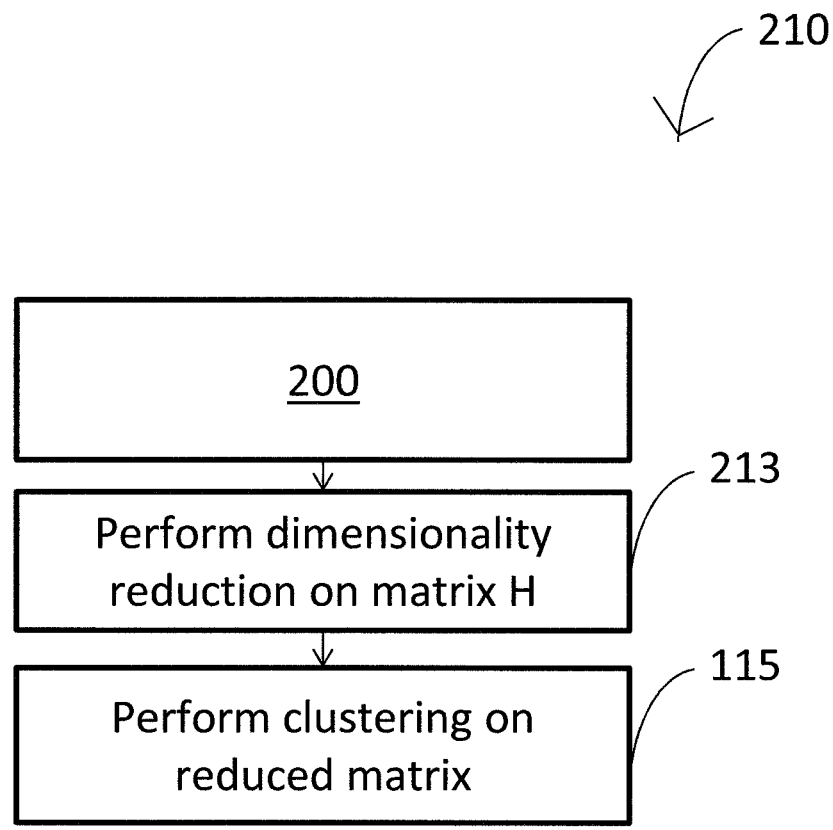
FIG. 2B is a flow chart illustrating a method in accordance with an embodiment of the present invention.

A process 200 in accordance with an embodiment is now described with reference to FIG. 2. The process 200 includes a series of actions described in a particular order, however, these actions may be performed in any order that would be understood as appropriate by those of skill in the art. The process 200 begins at block 201 where a dataset of interactions is obtained. Data can be ingested in the form of, e.g., (user, client) tuples for each interaction with the desired social media platform. This data can then be used, e.g., to form an undirected bipartite graph where one set of nodes are accounts (or users), the other set is clients, and edge weights are the number of times a user uses that particular client to interact with the social media platform.

The process 200 continues at block 203 where a pruned dataset is generated. The process 200 can prune data points, such as in the case of the bipartite graph described above, by pruning edges of the graph starting from edges having less than a minimum edge weight in order to avoid drawing false correlations between clients. For example, users may experiment with new social media clients, briefly trying them out, but then choose not to continue to use one or more of those clients. By removing data showing only a very small number of interactions, this sort of weak association can be removed from the data before further processing. Outliers also may be pruned based on various further factors as may be appreciated by those skilled in the art. Outlier clients, whether those used by too few or those used by too many accounts, may be identified and pruned. Similarly outlier accounts may be identified and pruned based on their interacting with an unusually large number of clients. Outliers can thus be removed from the underlying graph and the resulting sub-components may in some embodiments be further ordered by number of nodes. According to certain embodiments it may be beneficial, however, to keep nodes which are accounts that use a single client. If enough of them are present to generate a topic of size 1, they can still contribute to understanding of what technology is shared by users.

The process 200 continues at block 205 where the pruned dataset is normalized across accounts. Normalizing the data remaining after pruning can be performed to ensure that each user account's collection of entries sum to 1 and the (user, client) pair is the percentage of the user's total pruned interactions with the social media platform using that specific client. At this point the process 200 also may prune all edges within this normalized graph which are less than a certain minimum percentage, such as 1%.

The process 200 continues at block 207 where one or more connected sub-components are identified in the pruned dataset. If a pair of (user, client) data points share either the same user or the same client, then those data points belong to the same connected sub-component. The process 200 may determine which sub-components are considered complex enough to require running topic modeling on. Some sub-components may instead be classified as "simple," in which case topic modeling is not necessary. Clients in a simple sub-component may instead be defined as a single technology stack, and all users of such clients may be associated with a single community. In one embodiment, an elbow finding method may be used based on the percentage of total nodes of the dataset that are contained within the sub-component.

The process 200 continues at block 209 where topic modeling is performed to generate a matrix H. Complex sub-components can be processed as follows. First, the sub-component is translated into a matrix that maps users to clients, where users are rows and clients are columns. Entry i,j of the matrix represents the percent of the pruned interactions where user i uses client j. Then the number of topics is determined for this user, client matrix. This may be done in an automated fashion by, for example, singular value decomposition (SVD) and elbow finding. At this point topic modeling can be used as a form of dimensionality reduction on the user, client matrix.

The process 200 continues at block 211 where a first client X is associated with a topic. The resulting topics from the topic modeling performed at block 209 are clients which are typically used together. This can be used to determine that a client X is associated with another client Y, or that a client has consistently been used on its own. In one embodiment, Non-negative Matrix Factorization (NMF) may be used as the topic modeling algorithm.

Different clients will have different things that they are good at. Some may allow spoofing geolocations easily. Others may allow automated posting or reposting content. Groups that can afford to may create additional client applications to achieve desired efficiencies if their original accounts are banned. App review websites have been known to suggest switching to alternative clients after 'a wave of bans' was associated with accounts using a particular application.

The datasets shown in FIGS. 3 and 4 have groups of clients that are consistently used together. These can be visualized in graph form or detected and presented via topic modeling. Some client groupings make sense and are not necessarily nefarious, as individuals who prefer the one or another of the competing smartphone vendors may potentially have different client names (depending on the social media platform). This may be still be useful in order to determine a user's technology preference for other purposes such as targeted advertising.

The dataset shown in FIG. 3 reduces to a number of client 'topics' equal to about 25% of the raw client nodes. This includes the 'basic' topic of standard clients as well as the topics determined by NMF and simple subcomponents of the graph. Methods in accordance with the present invention allow for performing dimensionality reduction for determining technology stack communities, and also for determining groups of clients which are exclusively used together by a group of users, which can indicate an association between accounts.

Figure 12:
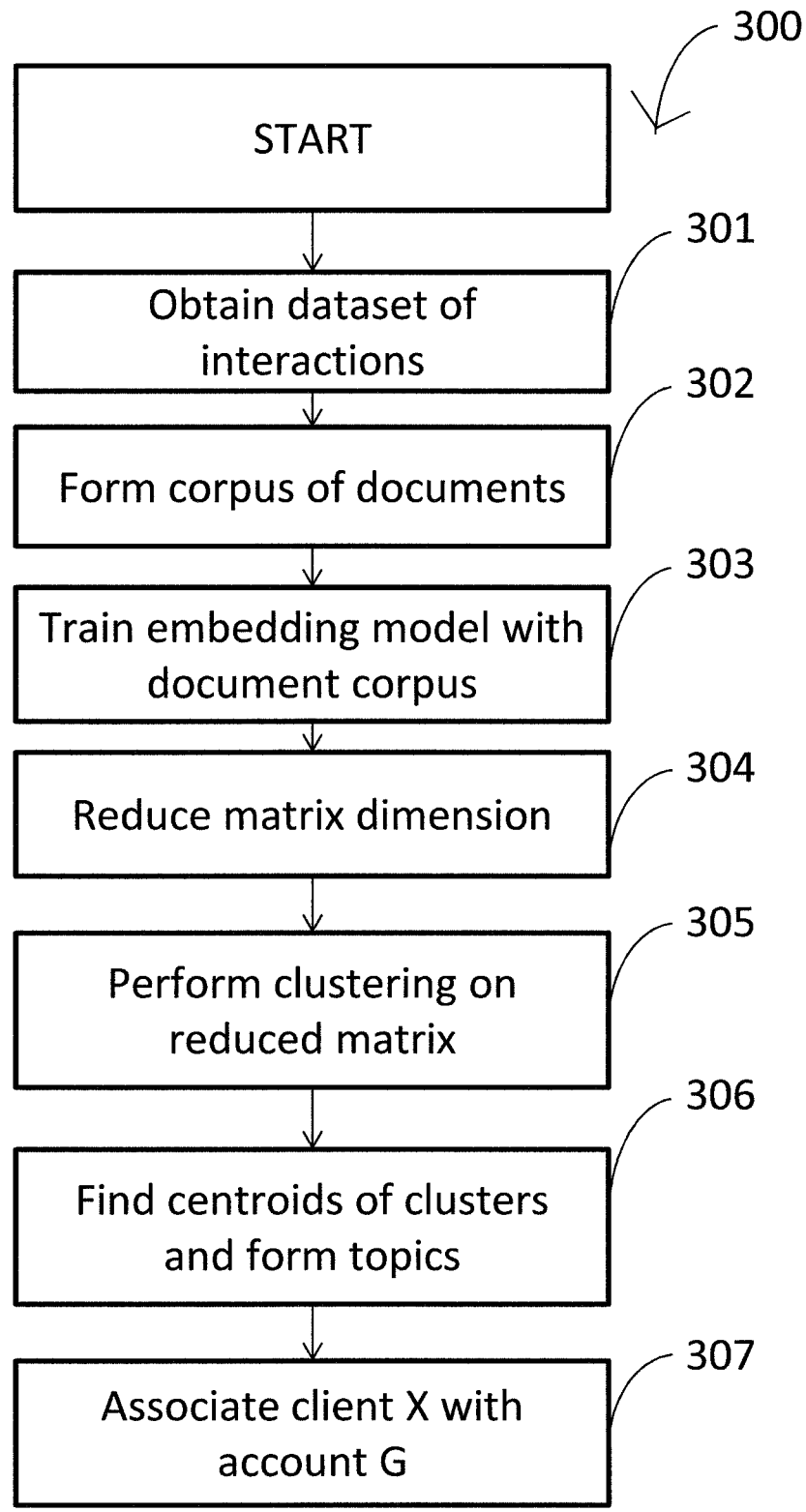
FIG. 12 is a flow chart illustrating a method in accordance with an embodiment of the present invention.

A process 300 in accordance with an embodiment is now described with reference to FIG. 12. The process 300 includes a series of actions described in a particular order, however, these actions may be performed in any order that would be understood as appropriate by those of skill in the art. The process 300 begins at block 301 where a dataset of interactions is obtained. Data can be ingested in the form of, e.g., (user, client) tuples for each interaction with the desired social media platform. The process 300 continues at block 302 where this data is used to form a corpus of documents representing client usage by account over time. This corpus can be formed by generating a document for each account which is composed of sentences representing the account's interactions with a social media platform. In one embodiment, each sentence is composed of the client used, translated to a single word without spaces or punctuation, repeated once per interaction over a period of time such as a day. Each paragraph is composed of multiple sentences and quantized over a longer period of time such as a week.

The process 300 continues at block 303 where the corpus of documents is used to train an embedding model which can be used to generate jointly embedded document and word vectors where documents are accounts and words are social media clients. These vectors represent points in a high dimensional space. This space may be chosen to have a number of dimensions as will be appreciated by those of skill in the art. In exemplary embodiments, the embeddings may represented with several hundred dimensions. The process 300 continues at block 304, where dimensionality reduction is performed on the high dimensional matrix. Reducing the dimension of the matrix can improve clustering performance. According to one embodiment, this may involve using UMAP to reduce the embedding to two dimensions. In other embodiments, dimensionality reduction can instead reduce to a different number of dimensions as may be appreciated by those of skill in the art, such as three, four, or five dimensions.

The process 300 continues at block 305, where clustering is performed on the reduced matrix using a density-based unsupervised clustering algorithm. This may include running HDBSCAN on the two-dimensional representation of the reduced matrix in order to generate multiple clusters of accounts with similar client usage. These are technology stack communities as discussed above and indicate groups of potentially related accounts.

The process 300 continues at block 306, where a centroid of each cluster is computed. The closest words (clients) to each centroid form a topic. These clients within a topic are associated with each other and the cluster of accounts that was used to obtain the centroid. This allows for determining technology stack communities across an entire social media platform without precomputing outliers or generating sub-components. Accordingly, the process 300 continues at block 307 where the process 300 determines, using the clusters and the reduced matrix, that a client X is associated with a group of accounts G.

Depending on the embodiment, certain acts, events, or functions of any of the methods described herein can be performed in a different sequence, can be added, merged, or left out all together. Not all described acts or events are necessarily required for the practice of any claimed method. Moreover, in certain embodiments, acts or events can be performed concurrently, rather than sequentially.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

We claim:

1. A method of identifying related social media accounts in a plurality of social media accounts of a social media platform, based on social media clients used by the social media accounts to interact with the social media platform, the method comprising:
obtaining a first dataset of information including, for each interaction between one of the plurality of social media accounts and the social media platform, the social media account and the social media client used by the social media account for the interaction;
using the first dataset of information to generate a pruned dataset of information including accounts, clients, and numbers of interactions between the accounts and clients by using an unsupervised machine learning algorithm to identify and exclude outlier accounts and outlier clients from the first dataset;
normalizing the pruned dataset across accounts;
identifying, in the pruned dataset, at least one connected sub-component of the pruned dataset;
performing topic modeling of the at least one connected sub-component to generate a matrix W associating the accounts of the connected sub-component with topics from the topic modeling; and
determining, using the matrix W, that a first account A is associated with a second account B.

2. The method of claim 1, wherein identifying outlier accounts includes identifying at least one account with interactions with more different clients than a threshold cumulative percentage of all accounts with lower numbers of different clients.

3. The method of claim 1, wherein identifying outlier clients includes identifying at least one client with interactions with more different accounts than a threshold cumulative percentage of all clients with lower numbers of different accounts.

4. The method of claim 1, wherein identifying outlier clients includes identifying at least one client with interactions with only one account.

5. The method of claim 1, wherein identifying outlier clients and outlier accounts includes identifying at least one account-client pair with fewer interactions than a minimum cumulative percentage of all account-client pairs with greater numbers of interactions.

6. The method of claim 1, the method further comprising:
performing a dimensionality reduction on the matrix W to generate a reduced matrix; and
performing a density-based unsupervised clustering algorithm on the reduced matrix to determine that a group of at least three accounts are all associated with each other.

7. A method of identifying related social media clients in a plurality of social media clients used to interact with a social media platform, based on the social media accounts that use the social media clients to interact with the social media platform, the method comprising:
obtaining a first dataset of information including, for each interaction between one of the plurality of social media accounts and the social media platform, the social media account and the social media client used by the social media account for the interaction;
using the first dataset of information to generate a pruned dataset of information including accounts, clients, and numbers of interactions between the accounts and clients by using an unsupervised machine learning algorithm to identify and exclude outlier accounts and outlier clients from the first dataset;
normalizing the pruned dataset across accounts;
identifying, in the pruned dataset, at least one connected sub-component of the pruned dataset;

performing topic modeling of the at least one connected sub-component to generate a matrix H associating topics from the topic modeling with the clients of the connected sub-component;

determining, using the matrix H, that a first client X is associated with a second client Y.

8. The method of claim 7, wherein identifying outlier accounts includes identifying at least one account with interactions with more different clients than a threshold cumulative percentage of all accounts with lower numbers of different clients.

9. The method of claim 7, wherein identifying outlier clients includes identifying at least one client with interactions with more different accounts than a threshold cumulative percentage of all clients with lower numbers of different accounts.

10. The method of claim 7, wherein identifying outlier clients includes identifying at least one client with interactions with only one account.

11. The method of claim 7, wherein identifying outlier clients and outlier accounts includes identifying at least one account-client pair with fewer interactions than a minimum cumulative percentage of all account-client pairs with greater numbers of interactions.

12. The method of claim 7, the method further comprising:

performing a dimensionality reduction on the matrix H to generate a reduced matrix; and performing a density-based unsupervised clustering algorithm on the reduced matrix to determine that a group of at least three clients are all associated with each other.

\* \* \* \* \*